United States Patent Office 3,542,788
Patented Nov. 24, 1970

3,542,788
1-AMINO-5-PHENYL-2-PYRROLEPROPIONIC ACID AND CONGENERS
Leland J. Chinn, Morton Grove, and William K. Sprenger, Niles, Ill., assignors to G. D. Searle & Co., Chicago, Ill., a corporation of Delaware
No Drawing. Filed June 12, 1968, Ser. No. 736,300
Int. Cl. C07d 27/26
U.S. Cl. 260—294               15 Claims

ABSTRACT OF THE DISCLOSURE

Preparation and valuable anti-protozoal, anti-bacterial, anti-inflammatory, and anti-ulcerogenic properties of 2-pyrrolepropionic acids and esters substituted in the 1-position by amino, dialkylamino, cyclic amino, N-alkyl-N-phenylamino, diphenylamino, alkanoylamino, cycloalkylcarbonylamino, alkoxycarbonylamino, benzoylamino, hydroxybenzoylamino, alkoxybenzoylamino, or pyridyl carbonylamino and in the 5-position by phenyl, halophenyl, or alkoxyphenyl are disclosed.

---

This invention relates to 1-amino-5-phenyl-2-pyrrolepropionic acid and congeners, and to processes for the preparation thereof. More particularly, this invention provides new, useful, and unobvious hydrazines and hydrazides of the formula

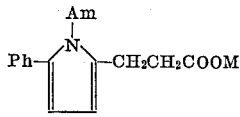

wherein Am represents an amino radical, M represents hydrogen or alkyl, and Ph represents phenyl optionally substituted by halogen and/or alkoxy.

The hydrazines of this invention are compounds of the foregoing formula wherein the amino radicals represented by Am include, in addition to the primary amino grouping —NH$_2$, dialkylamino, cyclic amino, N-alkyl-N-phenylamino, and diphenylamino. Preferably, the alkyl groupings comprehended by Am are of lower order. Typical and preferred cyclic amino embodiments of Am are pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, hexamethylenimino, and like monovalent, saturated, heterocyclic groupings essentially comprising 5, 6, or 7 annular atoms including nitrogen. The terminal "ino" in the radical names set forth denotes attachment of the radicals thus characterized via nitrogen.

The hydrazides of this invention are compounds of the foregoing formula wherein the amino radicals represented by Am are acylated, including alkanoylamino optionally substituted by cyano, cycloalkylcarbonylamino, alkoxycarbonylamino, benzoylamino optionally substituted by one or more hydroxys and/or alkoxys, and pyridylcarbonylamino. Preferably, the alkanoyl and alkoxy constituents of Am, like the alkyl groupings embraced thereby, are of lower order; and the cycloalkylcarbonylamino groupings contemplated by Am include at least 4 and not more than 7 carbons, thus,

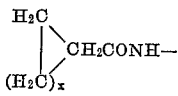

x being a positive integer less than 5. Among the substituted benzoylamino groupings represented by Am, those comprising fewer than 4 hydroxys or lower alkoxys—situate ad libitum about the benzene ring—are preferred.

The substituted phenyl groupings represented by Ph in the introductory formula hereof are preferably limited to those in which but 1 halogen or lower alkoxy is present. Positioning relative to the point of attachment is not critical. Among the halogen constituents, fluorine, chlorine, and bromine are preferred.

The alkyls embraced by M, like those elsewhere in the enformulated compounds, are preferably of lower order.

Those skilled in the art will recognize that alkyls of lower order (i.e., lower alkyls) are typified by methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain hydrocarbon radicals of empirical formula

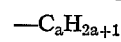

wherein $a$ represents a positive integer less than 8. Alkanoyls of lower order are the acyl radicals which eventuate by removal of hydroxyls from alkanoic acids containing fewer than 8 carbon atoms, i.e., formyl, acetyl, propionyl, butyryl, valeryl, hexanoyl, heptanoyl, and (branched-chain) isomers thereof.

The compounds to which this invention relates are useful by reason of their valuable biological properties. Thus, for example, the compounds are anti-protozoal, anti-bacterial, and anti-inflammatory agents. Additionally, the hydrazides of this invention are anti-ulcerogenic.

The anti-protozoal utility of the instant compounds is evident from the results of standardized tests for their capacity to inhibit the growth of *Trichomonas vaginalis* and *Tritrichomonas foetus*, conducted as follows. To 80 volumes of a modified Diamond medium prepared by mixing 1200 parts of trypticase (Baltimore Biological Laboratories), 600 parts of yeast extract (Disco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water; adjusting the pH to 6.8 with 4% sodium hydroxide; incorporating 30 parts of agar (Baltimore Biological Laboratories); boiling for 1 minute to dissolve the agar; and sterilizing in an autoclave, is aseptically added 20 volumes of sterile Dubos medium serum. The resultant medium is inoculated with 1% (by volume) of either a 48-hr. or a 72-hr. culture of *T. vaginalis* or *T. foetus*, whereupon 1 ml. of the inoculated medium is mixed with 10 mg. of test compound. The mixture is incubated anaerobically at 37° for 48 hr. and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10, and 1 mcgm. of test compound per ml.; and the resultant mixtures are inoculated anaerobically as before at 37° for 48 hr. and then examined microscopically for motile trichomonads. Controls are provided by concurrent incubations identical with the foregoing except for the absence of test compound. Results of testing the products of Examples 3, 4, 6, 8, 11, 14, 18, 19, 22, and 27 hereinafter by the foregoing procedure, using *T. vaginalis* as the test organism, are shown in Table I. Potency is defined as the lowest concentration, in mcgm. per ml., at which anti-protozoal activity is observed.

TABLE I

| Example: | Potency |
|---|---|
| 3 | 10,000 |
| 4 | 1000 |
| 6 | 10,000 |
| 8 | 1000 |
| 11 | 10,000 |
| 14 | 1000 |
| 18 | 10,000 |
| 19 | 10,000 |
| 22 | 1000 |
| 27 | 1000 |

Further evidence of the anti-protozoal activity of the instant compounds is provided by a standardized test for their capacity to inhibit the growth of *Tetrahymena gelleii*. In this test, a nutrient broth consisting of 12 gm. of proteose peptone, 8 gm. of sucrose, and 1000 ml. of water is sterilized, inoculated with an axenic culture of the test organism, and incubated at approximately 25° for 24 hr., whereupon 0.5 ml. quantities are aseptically transferred to each of two test tubes, one of which contains approximately 5 mg. of compound. After a second 24-hr. incubation at approximately 25°, growths of the organism are compared by microscopic examination.

The anti-bacterial utility of the instant compound is evident from the results of a standardized test whereby sterile blood agar plates are inoculated with *Diplococcus pneumoniae*, approximately 5 mg. of compound is placed on the surface of each plate so as to cover a circle approximately 4 mm. in diameter, and the plates are thereupon incubated for 24 hr. at 36°. Clear zones of inhibition signify the utility in question.

The anti-inflammatory utility of the instant compounds is evident from the results of a standardized test for their capacity to inhibit the formation of granuloma tissue induced in rats by implantation of cotton. The procedure is a modification of one described by Dulin, Proc. Soc. Exp. Biol. Med., 90, 115 (1955). Male rats weighing 180–220 gm. are adrenalectomized and arranged into groups of 6 animals each. The animals are maintained on aqueous 0.86% sodium chloride (in lieu of drinking water) for the duration of the test, the saline being supplemented with glucose q.s. 5% for the first 24 hr. following adrenalectomy. On the day after the adrenalectomy, 4 cotton dental pellets having an average weight of approximately 6 mg. are individually implanted in a bilateral position in the pectoral and dorsal lateral neck regions of each animal. Test compound, dissolved or suspended in a saline-wetting agent mixture or in corn oil, is administered by stomach tube on the day of the pellet implantation; and this treatment is repeated on the following day. The day after the last treatment, the animals are sacrificed; and the pellets, with associated granuloma tissue, are carefully dissected, dried and weighed. These weights are compared with those from a group of control animals concurrently treated as above save for omission of the test compound. A compound is considered active if it causes a significant ($P<0.5$) decrease in the weight of the granuloma tissue.

Further evidence of the anti-inflammatory activity of the instant compounds is provided by a standardized test for their capacity to inhibit the edema induced in rats by injection of carrageenin. The procedure is a modification of one described by Winter et al., Proc. Soc. Exp. Biol. Med., 111, 5444 (1962). Compound is administered subcutaneously or intragastrically—dissolved or suspended in 0.5 ml. of aqueous 0.86% sodium chloride, propylene glycol, a mixture of these vehicles, or corn oil—to each of 10 male rats weighing 100–130 gm. A like group of rats to which is identically and concurrently administered vehicle alone serves as controls. Precisely 1 hr. later, each animal is injected under the plantar surface of each hind foot with 0.1 ml. of an aqueous 1% solution of carrageenin (Marine Colloids, Inc., Type 402). A compound is considered anti-inflammatory if the average total circumference of the 2 hind feet in the group tested therewith, which is measured in arbitrary units 5 hr. after the carrageenin injection, is significantly ($P \leq 0.05$) less than the corresponding value for the control group.

The anti-ulcerogenic utility of the instant hydrazides is evident from the results of a standardized test for their capacity to inhibit the ulceration reported by Shay et al., Gastroenterology, 5, 43 (1945), to occur in rats subjected to fasting and pyloric ligation. In this test, male Charles River rats weighing 200–250 gm. and fasted 72 hr. prior to ligation are used. Immediately following ligation, the prescribed dose of compound, dissolved or suspended in 1.0 ml. of pH 2.0 hydrochloric acid, is intragastrically administered to each of a group of 6 animals. A like group of animals to which is identically and concurrently administered the acid alone serves as controls. Precisely 19 hr. later, the stomachs of surviving animals are excised and examined under 5x magnification. The number of ulcers occurring in the non-secretory portion of each stomach is counted in 4 groups according to size ($<$2 mm., 2–4 mm., 4–8 mm., and $>$8 mm.); and each rat receives a score, z which is a weighted average of the logarithms of the ulcer counts in the several size groups determined by a formula found approximately optimal by discriminant function analysis to be $z = 20.00 \log (N_{1+1}) + 0.22 \log (N_{2+1})$
$+ 46.76 \log (N_{3+1}) + 6.11 \log (N_{4+1})$ where $N_1 \ldots N_4$ are the observed ulcer counts of the increasing size groups. Since long-term studies in approximately 400 animals show that the average z value for controls is 96.2, with a standard error per group of 6 equal to 18.97, a decrease in the average z score for a given test group, relative to concurrent controls, amounting to 37.5 or more is significant ($P \leq 0.05$); and a compound producing such a decrease is considered anti-ulcerogenic.

Those skilled in the art will recognize that observations of activity in standardized tests for particular biological effects are fundamental to the development of valuable new drugs, both veterinary and human.

Preparation of the pyrrolepropionic acids of this invention proceeds by heating a 4,7-dioxoheptanoic acid of the formula

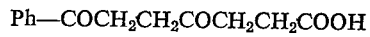

wherein Ph is defined as before, with a substituted hydrazine of the formula

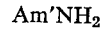

wherein Am' is identical with Am as hereinbefore defined excepting that it does not represent —NH$_2$, in the presence of a dehydrating agent such as p-toluenesulfonic acid, using an inert, organic solvent such as benzene, toluene, or acetic acid as the reaction medium. As an exception to this procedure pyrrolepropionic acids hereof wherein the annular nitrogen is substituted by —NH$_2$ are prepared by replacing the substituted hydrazine called for in the foregoing reaction with N-aminophthalimide and consecutively treating the resultant 1 - phthalimido-2-pyrrolepropionic acid with a boiling solution of hydrazine hydrate in ethanol and carbon dioxide in ammonium hydroxide solution. From the pyrrolepropionic acids of the invention, on heating with an appropriate alkanol in the presence of sulfuric acid, the corresponding esters hereof (M in the introductory formula=alkyl) are obtained.

The following examples described in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 5 - (p - methoxyphenyl) - 1 - phthalimido-2-pyrrolepropionic acid.—A mixture of 212 parts of 7-(p-methoxyphenyl)-4,7-dioxoheptanoic acid, 132 parts of N-aminophthalimide, 1 part of p-toluenesulfonic acid monohydrate, and 7200 parts of benzene is heated at the boiling point under reflux for 2 hours, water being removed as formed. Solvent is thereupon removed by vacuum distillation and the residue is taken up in a minimum volume of hot ethyl acetate. The hot ethyl acetate solution is mixed with decolorizing charcoal and immediately filtered. The hot filtrate is diluted with an equal volume of hexane. The resultant mixture is chilled; and the precipitate which forms is isolated by filtration, washed with hexane, and dried in vacuo at 60°. The product thus isolated is 5-(p-methoxyphenyl)-1-phthalimido-2-pyrrolepropionic acid melting at approximately 170–171°.

(B) 1 - amino - 5 - (p - methoxyphenyl) - 2 - pyrrolepropionic acid.—To a suspension of 90 parts of 5-(p-methoxyphenyl) - 1 - phthalimido - 2 - pyrrolepropionic acid in 1600 parts of ethanol is added 23 parts of hydrazine hydrate. The resultant mixture is heated at the boiling point under reflux for 1 hour, then cooled and stripped of solvent by vacuum distillation. The residue is taken up in 1500 parts of approximately 2% ammonium hydroxide, and the resultant solution is filtered. Carbon dioxide is passed through the filtrate for 30 minutes. The yellow precipitate which forms is filtered out, and the filtrate is concentrated to ⅓ its original volume by vacuum distillation. The solid which separates is collected on a filter, washed with cold water, dried in vacuo at 60°, and recrystallized from 2-propanol to give 1 - amino - 5 - (p - methoxyphenyl) - 2 - pyrrolepropionic acid melting at approximately 180–181°.

EXAMPLE 2

1 - dimethylamino - 5 - phenyl - 2 - pyrrolepropionic acid.—A mixture of 142 parts of 4,7 - dioxo - 7 - phenylheptanoic acid, 36 parts of 1,1-dimethylhydrazine, 1 part of p-toluenesulfonic acid monohydrate, and 5400 parts of toluene is heated at the boiling point under reflux for 2 hours, water being removed as formed. Toluene is then distilled off in vacuo, and the residue is taken up in a minimum volume of hot 10% acetone in ethyl acetate. The resultant solution is mixed with decolorizing charcoal and filtered hot. The filtrate is diluted with hexane to the point of incipient precipitation and then chilled. The precipitate thrown down is collected on a filter and dried in air. The product thus isolated is 1-dimethylamino-5-phenyl-2-pyrrolepropionic acid.

EXAMPLE 3

1 - dimethylamino - 5 - (p - methoxyphenyl) - 2 - pyrrolepropionic acid.—A mixture of 160 parts of 7-(p-methoxyphenyl) - 4,7 - dioxoheptanoic acid, 36 parts of 1,1-dimethylhydrazine, 1 part of p-toluenesulfonic acid monohydrate, and 5400 parts of toluene is heated at the boiling point under reflux for 1½ hours, water being removed as formed. The toluene is thereupon distilled off in vacuo, and the residue is taken up in a minimum volume of hot 10% acetone in ethyl acetate. Decolorizing charcoal is mixed in, and the mixture is thereupon filtered hot. The filtrate is diluted with ½ volume of hexane and thereupon chilled. The precipitate which forms is isolated by filtration and dried in air. Recrystallized from aqueous ethanol, it affords 1 - dimethylamino - 5 - (p-methoxyphenyl) - 2 - pyrrolepropionic acid melting at approximately 129–130°.

EXAMPLE 4

5 - (p - methoxyphenyl) - 1 - pyrrolidino - 2 - pyrrolepropionic acid.—A mixture of 132 parts of 7-(p-methoxyphenyl) - 4,7 - dioxoheptanoic acid, 62 parts of 1 - aminopyrrolidine hydrochloride, 50 parts of anhydrous potassium acetate, 1 part of p-toluenesulfonic acid monohydrate, and 7200 parts of benzene is heated at the boiling point under reflux for 24 hours, water being removed as formed. Solvent is then stripped by vacuum distillation; and the residue is crystallized from aqueous methanol, using decolorizing charcoal in process. The light tan solid thus obtained is recrystallized from a mixture of ethyl acetate and hexane to give 5 - (p - methoxyphenyl) - 1 - pyrrolidino - 2 - pyrrolepropionic acid melting at approximately 100–101°.

EXAMPLE 5

5-(p-fluorophenyl) - 1 - piperidino-2-pyrrolepropionic acid.—A mixture of 101 parts of 7-(p-fluorophenyl)-4,7-dioxoheptanoic acid, 41 parts of 1-aminopiperidine, 1 part of p-toluenesulfonic acid monohydrate, and 4500 parts of toluene is heated at the boiling point under reflux for 18 hours, water being removed as formed. Solvent is then distilled off in vacuo; and the residue is twice crystallized from aqueous 2-propanol, using decolorizing charcoal in process, to give 5-(p-fluorophenyl)-1-piperidino-2-pyrrolepropionic acid melting at approximately 164–165°.

EXAMPLE 6

5 - (p-methoxyphenyl) - 1 - piperidino-2-pyrrolepropionic acid.—A mixture of 106 parts of 7-(p-methoxyphenyl)-4,7-dioxoheptanoic acid, 41 parts of 1-aminopiperidine, 1 part of p-toluenesulfonic acid monohydrate, and 4500 parts of toluene is heated at the boiling point under reflux for 8 hours, water being removed as formed. Insoluble solids are filtered out, and the filtrate is stripped of solvent by vacuum distillation. The residual oil is crystallized from a mixture of benzene and hexane to give a gray solid which is recrystallized from benzene to give 5-(p-methoxyphenyl)-1-piperidino - 2 - pyrrolepropionic acid melting at approximately 109.5–110°.

EXAMPLE 7

5-(p - chlorophenyl) - 1 - hexamethylenimino-2-pyrrolepropionic acid.—A mixture of 60 parts of 7-(p-chlorophenyl)-4,7-dioxoheptanoic acid, 26 parts of 1-amino-hexmethylenimine, 1 part of p-toluenesulfonic acid monohydrate, and 3600 parts of toluene is heated at the boiling point under reflux for 6 hours, water being removed as formed. The toluene is thereupon distilled off in vacuo; and the residue is crystallized from aqueous methanol, using decolorizing charcoal in process. The brown solid thus obtained is recrystallized from a mixture of ether and hexane, again using decolorizing charcoal in process, to give 5-(p-chlorophenyl)-1-hexamethylenimino-2-pyrrolepropionic acid melting at 145–147°.

EXAMPLE 8

5-(p-methoxyphenyl)-1-(N-methyl - N - phenylamino)-2-pyrrolepropionic acid.—A mixture of 212 parts of 7-(p-methoxyphenyl)-4,7-dioxoheptanoic acid, 100 parts of 1-methyl-1-phenylhydrazine, 1 part of p-toluenesulfonic acid monohydrate, and 9000 parts of benzene is heated at the boiling point under reflux for 6 hours, water being removed as formed. Solvent is stripped by vacuum distillation; and the residue is recrystallized from aqueous 2-propanol, using decolorizing charcoal in process. The product thus isolated is 5-(p-methoxyphenyl)-1-(N-methyl-N-phenylamino)-2-pyrrolepropionic acid melting at approximately 120–121°.

EXAMPLE 9

Methyl 5-(p - methoxyphenyl)-1-(N-methyl-N-phenylamino)-2-pyrrolepropionate.—A mixture of 24 parts of 5-(p-methoxyphenyl)-1-(N-methyl - N - phenylamino)-2-pyrrolepropionic acid, 2000 parts of methanol, and approximately 5 parts of concentrated sulfuric acid is heated at the boiling point under reflux for 2 hours, then concentrated to ⅕ volume by vacuum distillation. To the concentrate is added ½ its volume of water. The resultant mixture is heated to the boiling point with decolorizing charcoal and filtered hot. From the filtrate, on cooling, methyl 5-(p - methoxyphenyl)-1-(N - methyl-N-phenylamino)-2-pyrrolepropionate precipitates. The product is isolated by filtration and dried in air. It melts at 54–56°.

EXAMPLE 10

5-(p-fluorophenyl)-1-diphenylamino - 2 - pyrrolepropionic acid.—A mixture of 100 parts of 7-(p-fluorophenyl)-4,7-dioxoheptanoic acid, 74 parts of 1,1-diphenylhydrazine, 1 part of p-toluenesulfonic acid monohydrate, and 7200 parts of toluene is heated at the boiling point under reflux for 15 hours, water being removed as formed. The toluene is thereupon distilled off in vacuo; and the residue is crystallized from aqueous methanol, using decolorizing charcoal in process. The product thus obtained is 5-(p-fluorophenyl)-1-diphenylamino-2-pyrrolepropionic acid melting at approximately 102–103°.

EXAMPLE 11

1-formylamino - 5 - phenyl-2-pyrrolepropionic acid.— A mixture of 47 parts of 4,7-dioxo-7-phenylheptanoic acid, 12 parts of formic acid hydrazide, and 2000 parts of glacial acetic acid is heated at the boiling point under reflux for 4 hours. Solvent is thereupon removed by vacuum distillation; and the residue is crystallized from aqueous methanol, using decolorizing charcoal in process. The colorless product thus isolated is 1-formylamino-5-phenyl-2-pyrrolepropionic acid melting at approximately 141–142°.

EXAMPLE 12

5-(p - fluorophenyl)-1-formylamino - 2 - pyrrolepropionic acid.—A mixture of 148 parts of 7-(p-fluorophenyl)-4,7-dioxoheptanoic acid, 36 parts of formic acid hydrazide, 1 part of p-toluenesulfonic acid monohydrate, and 9000 parts of benzene is heated at the boiling point under reflux for 3 hours, water being removed as formed. Solvent is thereupon stripped by vacuum distillation; and the residue is crystallized from aqueous methanol, using decolorizing charcoal in process. The product thus isolated is 5-(p-fluorophenyl)-1-formylamino - 2-pyrrolepropionic acid melting at 208–210°.

EXAMPLE 13

5-(p-methoxyphenyl)-1-formylamino - 2 - pyrrolepropionic acid.—A mixture of 106 parts of 7-(p-methoxyphenyl)-4,7-dioxoheptanoic acid, 24 parts of formic acid hydrazide, 1 part of p-toluenesulfonic acid monohydrate, and 7200 parts of benzene is heated at the boiling point under reflux for 2 hours, water being removed as formed. Solvent is thereupon stripped by vacuum distillation. The residue is washed by trituration with hexane and then recrystallized from aqueous methanol, using decolorizing charcoal in process, to give 5-(p-methoxyphenyl)-1-formylamino-2-pyrrolepropionic acid melting at approximately 170–171°.

EXAMPLE 14

1 - acetylamino - 5 - (p-chlorophenyl)-2-pyrrolepropionic acid.—A mixture of 120 parts of 7-(p-chlorophenyl)-4,7-dioxoheptanoic acid, 34 parts of acetic acid hydrazide, 1 part of p-toluenesulfonic acid monohydrate, and 7200 parts of toluene is heated at the boiling point under reflux for 5 hours, water being removed as formed. The toluene is distilled off in vacuo; and the residue is washed by trituration with hexane and then crystallized from aqueous methanol, using decolorizing charcoal in process. The product thus isolated is 1-acetylamino-5-(p-chlorophenyl)-2-pyrrolepropionic acid melting at 199–201°.

EXAMPLE 15

Methyl 1-acetylamino-5-(p-chlorophenyl) - 2 - pyrrolepropionate.—A mixture of 360 parts of 1-acetylamino-5-(p-chlorophenyl)-2-pyrrolepropionic acid, 4800 parts of methanol, and 1 part of concentrated sulfuric acid is heated at the boiling point under reflux for 4 hours, then mixed with decolorizing charcoal and filtered hot. From the filtrate, on cooling, colorless needles of methyl 1-acetylamino - 5 - (p-chlorophenyl) - 2 - pyrrolepropionate separate. The product is isolated by filtration and dried in vacuo at 60°. It melts at approximately 160–161°.

EXAMPLE 16

1 - butyrylamino - 5 - (p-fluorophenyl)-2-pyrrolepropionic acid.—A mixture of 152 parts of 7-(p-fluorophenyl)-4,7-dioxoheptanoic acid, 60 parts of butyric acid hydrazide, 1 part of p-toluenesulfonic acid monohydrate, and 7200 parts of toluene is heated at the boiling point under reflux for 3 hours, water being removed as formed. The toluene is distilled off in vacuo; and the residue is crystallized from aqueous methanol, using decolorizing charcoal in process. The product thus isolated is 1-butyrylamino-5-(p-fluorophenyl)-2-pyrrolepropionic acid melting at approximately 173–174°.

EXAMPLE 17

1 - acetylamino - 5 - (p-methoxyphenyl)-2-pyrrolepropionic acid.—A mixture of 104 parts of 7-(p-methoxyphenyl)-4,7-dioxoheptanoic acid, 30 parts of acetic acid hydrazide, 1 part of p-toluenesulfonic acid monohydrate, and 7200 parts of toluene is heated at the boiling point under reflux for 1½ hours, water being removed as formed. Solvent is then stripped by vacuum distillation; and the residue is twice crystallized from aqueous methanol, using decolorizing charcoal in process. The product thus isolated is 1-acetylamino - 5 - (p-methoxyphenyl)-2-pyrrolepropionic acid melting at approximately 198–199°.

EXAMPLE 18

1 - cyanoacetylamino - 5 - (p-methoxyphenyl)-2-pyrrolepropionic acid.—A mixture of 160 parts of 7-(p-methoxyphenyl) - 4,7 - dioxoheptanoic acid, 60 parts of cyanoacetic acid hydrazide, 1 part of p-toluenesulfonic acid monohydrate, and 7200 parts of toluene is heated at the boiling point under reflux for 4 hours, water being removed as formed. The toluene is distilled off in vacuo; and the residue is chromatographed on silica gel, using ethyl acetate as developing solvent. From the eluate, on distillation of solvent and recrystallization of the residue from aqueous methanol—using decolorizing charcoal in process—1-cyanoacetylamino - 5 - (p-methoxyphenyl)-2-pyrrolepropionic acid melting at approximately 136–137° is obtained.

EXAMPLE 19

1 - cyclopropylcarbonylamino - 5 - (p-fluorophenyl)-2-pyrrolepropionic acid.—A mixture of 101 parts of 7-(p-fluorophenyl)-4,7-dioxoheptanoic acid, 41 parts of cyclopropylcarboxylic acid hydrazide, 1 part of p-toluenesulfonic acid monohydrate, and 4500 parts of toluene is heated at the boiling point under reflux for 6 hours, water being removed as formed. Solvent is thereupon stripped by vacuum distillation and the residue is washed by trituration with hexane. It is then consecutively crystallized from aqueous 2-propanol and a mixture of benzene and hexane, using decolorizing charcoal in process, to give 1 - cyclopropylcarbonylamino - 5 - (p-fluorophenyl)-2-pyrrolepropionic acid melting at approximately 166–167°.

EXAMPLE 20

1 - cyclopropylcarbonylamino - 5 - (p-methoxyphenyl)-2-pyrrolepropionic acid.—A mixture of 212 parts of 7-(p-methoxyphenyl)-4,7-dioxoheptanoic acid, 82 parts of cyclopropylcarboxylic acid hydrazide, 1 part of p-toluenesulfonic acid monohydrate, and 9000 parts of toluene is heated at the boiling point under reflux for 3 hours, water being removed as formed. The toluene is then distilled off in vacuo, and the residue is washed by trituration with hexane. It is thereupon consecutively crystallized from aqueous 2-propanol and benzene, using decolorizing charcoal in process, to give 1-cyclopropylcarbonylamino - 5 - (p-methoxyphenyl) - 2 - pyrrolepropionic acid melting at approximately 146–147°.

EXAMPLE 21

5 - (m-bromophenyl) - 1 - cyclohexylcarbonylamino-2-pyrrolepropionic acid.—A mixture of 248 parts of 7-(m-bromophenyl)-4,7-dioxoheptanoic acid, 116 parts of cyclohexylcarboxylic acid hydrazide, 1 part of p-toluenesulfonic acid monohydrate, and 9000 parts of toluene is heated at the boiling point under reflux for 3 hours, water being removed as formed. The toluene is thereupon distilled off in vacuo; and the residue is washed by trituration with hexane and consecutively crystallized from aqueous 2-propanol and a mixture of benzene and hexane, using decolorizing charcoal in process. The product thus isolated is 5-(m-bromophenyl)-1-cyclohexylcarbonylamino-2-pyrrolepropionic acid.

EXAMPLE 22

1 - ethoxycarbonylamino - 5 - (p-fluorophenyl)-2-pyrrolepropionic acid.—A mixture of 50 parts of 7-(p-fluorophenyl)-4,7-dioxoheptanoic acid, 21 parts of ethyl carbazate, and 3600 parts of toluene is heated at the boiling point under reflux for 4 hours, water being removed as formed. Solvent is stripped by vacuum distillation, and the crystalline residue is washed by trituration with hexane and recrystallized from aqueous ethanol to give 1-ethoxycarbonylamino - 5 - (p-fluorophenyl)-2-pyrrolepropionic acid melting at approximately 153–154°.

EXAMPLE 23

Ethyl 1-ethoxycarbonylamino-5-(p-fluorophenyl)-2-pyrrolepropionate.—A mixture of 248 parts of 1-ethoxycarbonylamino-5-(p - fluorophenyl)-2-pyrrolepropionic acid, 3200 parts of ethanol, and 1 part of concentrated sulfuric acid is heated at the boiling point under reflux for 2 hours, whereupon ½ volume of hot water followed by decolorizing charcoal is introduced. The resultant mixture is filtered hot. From the filtrate, on cooling, ethyl 1-ethoxycarbonylamine - 5 - (p-fluorophenyl)-2-pyrrolepropionate separates. The product melts at approximately 87–88°.

EXAMPLE 24

1 - tert. - butoxycarbonylamino-5-(p-methoxyphenyl)-2-pyrrolepropionic acid.—A mixture of 106 parts of 7-(p-methoxyphenyl)-4,7-dioxoheptanoic acid, 53 parts of tert.-butyl carbazate, and 3600 parts of toluene is heated at the boiling point under reflux for 4 hours, water being removed as formed. The toluene is distilled off in vacuo, and the residue is washed by trituration with hexane and crystallized from aqueous methanol to give 1-tert.-butoxycarbonylamino-5-(p-methoxyphenyl)-2-pyrrolepropionic acid melting at approximately 157–158°.

EXAMPLE 25

1-benzoylamino-5-(p - methoxyphenyl) - 2 - pyrrolepropionic acid.—A mixture of 212 parts of 7-(p-methoxyphenyl)-4,7-dioxoheptanoic acid, 110 parts of benzoic acid hydrazide, 1 part of p-toluenesulfonic acid monohydrate, and 10,800 parts of toluene is heated at the boiling point under reflux for 3 hours, water being removed as formed. The toluene is distilled off in vacuo; and the residue is washed by trituration with hexane and crystallized from aqueous ethanol, using decolorizing charcoal in process. The product thus isolated is 1-benzoylamino-5-(p-methoxyphenyl)-2-pyrrolepropionic acid melting at approximately 199–200°.

EXAMPLE 26

Methyl 1-benzoylamino-5-(p-methoxyphenyl) - 2 - pyrrolepropionate.—A mixture of 200 parts of 1-benzoylamino-5-(p-methoxyphenyl)-2-pyrrolepropionic acid, 1 part of concentrated sulfuric acid, and 1600 parts of methanol is heated at the boiling point under reflux for 2 hours, whereupon the methanol is removed by vacuum distillation. The residue is washed by trituration with hexane and crystallized from aqueous methanol, using decolorizing charcoal, to give methyl 1-benzoylamino-5-(p-methoxyphenyl)-2-pyrrolepropionate melting at approximately 119–120°.

EXAMPLE 27

5-(p - fluorophenyl)-1-(o-hydroxybenzoylamino)-2-pyrrolepropionic acid.—A mixture of 100 parts of 7-(p-fluorophenyl)-4,7-dioxoheptanoic acid, 60 parts of salicyclic acid hydrazide, 1 part of p-toluenesulfonic acid monohydrate, and 10,800 parts of toluene is heated at the boiling point under reflux for 1½ hours, water being removed as formed. The toluene is distilled off in vacuo, and the residue is washed by trituration with hexane and crystallized from a mixture of ethyl acetate and hexane to give 5-(p-fluorophenyl) - 1 - (o-hydroxybenzoylamino)-2-pyrrolepropionic acid. The product melts at around 120°, resolidifies, and melts again at 159–162°.

EXAMPLE 28

Methyl 5 - (p - fluorophenyl)-1-(o-hydroxybenzoylamino)-2-pyrrolepropionate.—A mixture of 276 parts of 5-(p-fluorophenyl)-1-(o - hydroxybenzoylamino)-2-pyrrolepropionic acid, 1 part of concentrated sulfuric acid, and 8000 parts of methanol is heated at the boiling point under reflux for 2 hours. The residue is taken up in approximately 8000 parts of ether, and the ether solution is dried over magnesium sulfate and filtered. From the filtrate, on standing, large prisms of methyl 5-(p-fluorophenyl)-1-(o-hydroxybenzoylamino) - 2 - pyrrolepropionate precipitate. The product is isolated by filtration, dried in air, and further purified by recrystallization from aqueous methanol. It melts at approximately 186–187°.

EXAMPLE 29

5-(p-chlorophenyl) - 1 - (p - hydroxybenzoylamino)-2-pyrrolepropionic acid.—A mixture of 160 parts of 7-(p-chlorophenyl)-4,7-dioxoheptanoic acid, 92 parts of p-hydroxybenzoic acid hydrazide, 1 part of p-toluenesulfonic acid monohydrate, and 7200 parts of toluene is heated at the boiling point under reflux for 24 hours, water being removed as formed. Solvent is distilled off in vacuo, and the residue is recrystallized from aqueous methanol to give 5-(p-chlorophenyl) - 1 - (p-hydroxybenzoylamino)-2-pyrrolepropionic acid melting at 224–226°.

EXAMPLE 30

5 - (p - methoxyphenyl)-1-(o-propoxybenzoylamino)-2-pyrrolepropionic acid.—A mixture of 84 parts of 7-(p-methoxyphenyl)-4,7-dioxoheptanoic acid, 64 parts of o-propoxybenzoic acid hydrazide, 1 part of p-toluenesulfonic acid monohydrate, and 7200 parts of toluene is heated at the boiling point under reflux for 4 hours, water being removed as formed. The solvent is thereupon stripped by vacuum distillation and the residue crystallized from aqueous methanol to give the desired 5-(p-methoxyphenyl)-1-(o-propoxybenzoylamino)-2-pyrrolepropionic acid.

EXAMPLE 31

1 - (3,4 - dimethoxybenzoylamino)-5-(p-methoxyphenyl)-2-pyrrolepropionic acid.—Substitution of 66 parts of 3,4-dimethoxybenzoic acid hydrazide for the o-propoxybenzoic acid hydrazide called for in Example 30 affords, by the procedure there detailed, 1-(3,4-dimethoxybenzoylamino)-5-(p-methoxyphenyl)-2-pyrrolepropionic acid.

EXAMPLE 32

5 - (p - fluorophenyl)-1-(3,4,5 - trimethoxybenzoylamino)-2-pyrrolepropionic acid.—Substitution of 80 parts of 7-(p-fluorophenyl)-4,7-dioxoheptanoic acid and 76 parts of 3,4,5-trimethoxybenzoic acid hydrazide for the 7-(p-methoxyphenyl)-4,7-dioxoheptanoic acid and o-propoxybenzoic acid hydrazide, respectively, called for in Example 30 affords, by the procedure there detailed, 5-(p-fluorophenyl) - 1 - (3,4,5 - trimethoxybenzoylamino)-2-pyrrolepropionic acid melting at approximately 256–257°.

EXAMPLE 33

1-(3,4,5 - trimethoxybenzoylamino)-5-(p-methoxyphenyl)-2-pyrrolepropionic acid.—A mixture of 160 parts of 7-(p-methoxyphenyl)-4,7-dioxoheptanoic acid, 142 parts of 3,4,5-trimethoxybenzoic acid hydrazide, 1 part of p-toluenesolfonic acid monohydrate, and 10,800 parts of toluene is heated at the boiling point under reflux for 2 hours, water being removed as formed. The toluene is distilled off in vacuo; and the residue is washed by trituration with hexane and crystallized from aqueous ethanol, using decolorizing charcoal in process, to give 1 - (3,4,5-trimethoxybenzoylamino)-5-(p - methoxyphenyl)-2-pyrrolepropionic acid monohydrate melting at approximately 225–226°. Water of crystallization is removed by heating in vacuo at around 120°.

EXAMPLE 34

Ethyl 1 - (3,4,5-trimethoxybenzoylamino) - 5-(p-methoxyphenyl)-2-pyrrolepropionate.—A mixture of 200 parts of 1 - (3,4,5-trimethoxybenzoylamino) - 5 - (p-methoxyphenyl)-2-pyrrolepropionic acid monohydrate, 4000 parts of ethanol, and 2 parts of concentrated sulfuric acid is heated at the boiling point under reflux for 3 hours, whereupon the reaction mixture is diluted with 2000 parts of hot water. Decolorizing charcoal is then stirred in, and the resultant mixture is filtered hot. From the filtrate, on cooling, ethyl 1 - (3,4,5-trimethoxybenzoylamino)-5-(p-methoxyphenyl) - 2-pyrrolepropionate precipitates. Isolated by filtration, washed with water, and dried in vacuo at around 60°, the product melts at approximately 160–161°.

EXAMPLE 35

5 - (p-fluorophenyl)-1-(3 - pyridylcarbonylamino)-2-pyrrolepropionic acid.—A mixture of 60 parts of 7-(p-fluorophenyl)-4,7-dioxoheptanoic acid, 34 parts of nicotinic acid hydrazide, 1 part of p-toluenesulfonic acid monohydrate, and 3600 parts of toluene is heated at the boiling point under reflux for 3 hours, water being removed as formed. Toluene is then stripped by vacuum distillation, and the residue is washed by trituration with hexane and crystallized from a mixture of ethyl acetate and hexane to give 5-(p-fluorophenyl)-1-(3-pyridylcarbonylamino)-2-pyrrolepropionic acid melting at 233–235°.

EXAMPLE 36

5 - (p-methoxyphenyl) - 1-(4-pyridylcarbonylamino)-2-pyrrolepropionic acid.—A mixture of 160 parts of 7-(p-methoxyphenyl)-4,7-dioxoheptanoic acid, 82 parts of isonicotinic acid hydrazide, 1 part of p-toluenesulfonic acid monohydrate, and 7200 parts of toluene is heated at the boiling point under reflux for 4 hours, water being removed as formed. Solvent is stripped by vacuum distillation. The residue, crystallized from a mixture of ethyl acetate and hexane and washed with ether, affords 5-(p-methoxyphenyl) - 1-(4-pyridylcarbonylamino)-2-pyrrolepropionic acid melting at 182–184°.

What is claimed is:

1. A compound of the formula

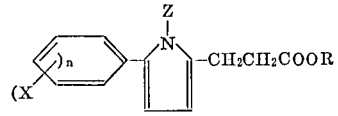

wherein Z represents amino, di(lower alkyl)amino, pyrrolidino, piperidino, hexamethylenimino, N-(lower alky)-N-phenylamino, diphenylamino, (lower alkanoyl)amino, cyanoacetylamino, cycloalkylcarbonylamino containing more than 3 and less than 8 carbons, (lower alkoxy)carbonylamino, benzoylamino, (hydroxybenzoyl)amino, [(lower alkoxy)benzoyl]amino, [di(lower alkoxy)benzoyl]amino, [tri(lower alkoxy)benzoyl]amino, or pyridylcarbonylamino; X represents halogen of atomic number less than 53 or lower alkoxy; n represents 0 or a positive integer less than 4; and R represents hydrogen or lower alkyl.

2. A compound according to claim 1 having the formula

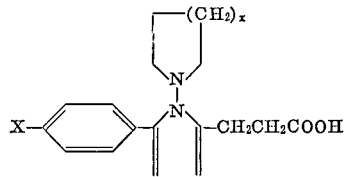

wherein X represents fluorine, chlorine, or methoxy and x represents a positive integer less than 4.

3. A compound according to claim 1 which is 5-(p-methoxyphenyl)-1-piperidino-2-pyrrolepropionic acid.

4. A compound according to claim 1 having the formula

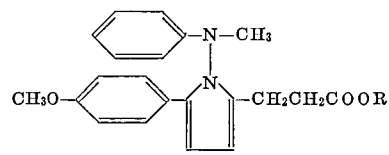

wherein R represents hydrogen or lower alkyl.

5. A compound according to claim 1 which is 5-(p-methoxyphenyl) - 1 - (N-methyl-N-phenylamino)-2-pyrrolepropionic acid.

6. A compound according to claim 1 having the formula

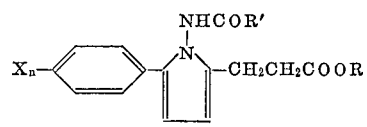

wherein R and R' each represent hydrogen or lower alkyl; X represents fluorine, chlorine, or methoxy; and $n$ represents 0 or 1.

7. A compound according to claim 1 which is 1-acetylamino-5-(p-chlorophenyl)-2-pyrrolepropionic acid.

8. A compound according to claim 1 having the formula

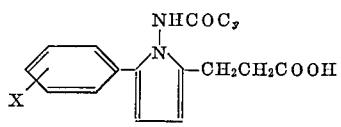

wherein Cy represents cycloalkyl containing more than 2 and less than 7 carbons and X represents holagen of atomic number less than 53 or methoxy.

9. A compound according to claim 1 which is 1-cyclopropylcarbonylamino-5 - (p-fluorophenyl)-2-pyrrolepropionic acid.

10. A compound according to claim 1 having the formula

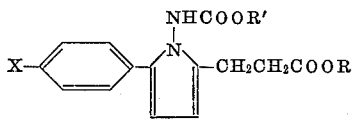

wherein R represents hydrogen or lower alkyl, R' represents lower alkyl, and X represents fluorine or methoxy.

11. A compound according to claim 1 which is 1-ethoxycarbonylamino - 5 - (p-fluorophenyl) - 2 - pyrrolepropionic acid.

12. A compound according to claim 1 having the formula

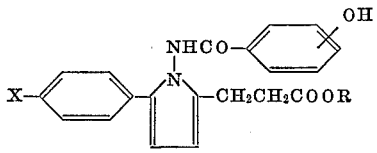

wherein R represents hydrogen or lower alkyl and X represents fluorine or chlorine.

13. A compound according to claim 1 which is 5-(p-fluorophenyl) - 1-(o-hydroxybenzoylamino)-2-pyrrolepropionic acid.

14. A compound according to claim 1 having the formula

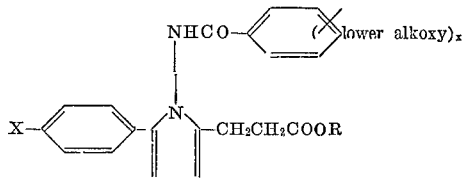

wherein R represents hydrogen or lower alkyl, X represents fluorine or methoxy, and $x$ represents a positive integer less than 4.

15. A compound according to claim 1 which is ethyl 1-(3,4,5 - trimethoxybenzoylamino) - 5-(p-methoxyphenyl)-2-pyrrolepropionate.

References Cited

UNITED STATES PATENTS

| | | | |
|---|---|---|---|
| 3,168,531 | 2/1965 | Short | 260—326.3 |
| 3,349,091 | 10/1967 | Chinn | 260—268 |

HENRY R. JILES, Primary Examiner

G. T. TODD, Assistant Examiner

U.S. Cl. X.R.

260—295, 295.5, 294.3, 326, 326.3

PO-1050
(5/69)

UNITED STATES PATENT OFFICE
CERTIFICATE OF CORRECTION

Patent No. 3,542,788                    Dated November 24, 1970

Inventor(s)   Leland J. Chinn and William K. Sprenger

It is certified that error appears in the above-identified patent and that said Letters Patent are hereby corrected as shown below:

Column 3, line 72, "(P < 0.5)" should be --(P < 0.05)--

Column 4, line 4, "5444" should be --544--.

Column 6, line 60, "hexmethylenimine" should be --hexamethylenimino--.

Column 9, line 62, "-carbonylamine" should be -- -carbonylamino--.

Column 10, line 30, "salicyclic" should be --salicylic

Column 11, line 30, "uenesolfonic" should be --uenesulfonic--.

Column 12, line 16, "N-(lower alky)-" should be --N-(lower alkyl)- --.

Column 13, line 2, "holagen" should be --halogen--.

Signed and sealed this 15th day of June 1971.

(SEAL)
Attest:

EDWARD M. FLETCHER, JR.
Attesting Officer

WILLIAM E. SCHUYLER,
Commissioner of Patent